United States Patent [19]

Yardley

[11] Patent Number: 4,648,664
[45] Date of Patent: Mar. 10, 1987

[54] HYDRAULIC ANTI-SKID BRAKING SYSTEMS FOR VEHICLES

[75] Inventor: Alfred Yardley, West Midlands, England

[73] Assignee: Lucas Industries Public Limited Company, United Kingdom

[21] Appl. No.: 707,438

[22] Filed: Mar. 1, 1985

[30] Foreign Application Priority Data

Mar. 7, 1984 [GB] United Kingdom ............... 8405903
Jul. 2, 1984 [GB] United Kingdom ............... 8416800

[51] Int. Cl.$^4$ ............................ B60T 8/42; F16K 1/00
[52] U.S. Cl. ...................................... 303/115; 251/321
[58] Field of Search ............... 303/113, 115, 116, 117; 137/625.25; 251/321

[56] References Cited

U.S. PATENT DOCUMENTS 2,417,242  3/1947  Eckel ............................ 251/321 X
4,264,111  4/1981  Shimizu et al. ...................... 303/115
4,474,413  10/1984  Farr ................................... 303/116

FOREIGN PATENT DOCUMENTS 2029914  3/1980  United Kingdom ............... 303/116

Primary Examiner—Douglas C. Butler
Assistant Examiner—Robert J. Oberleitner
Attorney, Agent, or Firm—Laff, Whitesel, Conte & Saret

[57] ABSTRACT

In an hydraulic anti-skid braking system of the pump and de-boost type, the de-boost piston is held in an advanced inoperative position by a volume of fluid trapped in a space and supplied by a pump. A bleed device communicating with the space is held in an open position during initial bleeding of the system by a friction device which acts as a stop and which is releasable when the bleed device is subjected to a predetermined pressure. This enables initial bleeding to be carried out automatically and without an operator operation to open and close a bleed device. After initial bleeding, the device can be opened manually to enable subsequent bleeding to be carried out, with the spring assembly acting on the de-boost piston also acting to close the bleed device following release of the manual force.

11 Claims, 3 Drawing Figures

HYDRAULIC ANTI-SKID BRAKING SYSTEMS FOR VEHICLES

This invention relates to hydraulic anti-skid braking systems for vehicles of the kind in which a supply of operating fluid from a supply to a vehicle brake is modulated by a modulator assembly in accordance with skid signals from skid sensing means, and an hydraulic pump incorporating at least one plunger working in a bore has a working chamber which is in communication with the modulator assembly to control brake reapplication following skid correction.

In the anti-skid braking systems described in GB-A-2029914 and GB-A-2069640 the modulator assembly comprises a bore in which works a de-boost piston for co-operation with a control valve assembly adapted to control communication between the supply of operating fluid and the brake through an expansion chamber defined in the bore between the piston and the control valve assembly. Normally the piston is held in an inoperative advanced position by a trapped volume of fluid supplied by the pump and, in this position, the valve assembly is fully open and the effective volume of the expansion chamber is at a minimum. When a skid signal is produced the trapped volume of fluid is released which permits the piston to move into a retracted position, initially to permit the valve assembly to close and isolate the supply from the brake, and subsequently to increase further the effective volume of the expansion chamber, whereby to relieve the brake-applying pressure. Following correction of the skid, the pressure from the pump is operative to urge the piston towards its advanced position, initially to re-apply the brake by pressurising the fluid in the expansion chamber, and subsequently opening the valve assembly to re-establish communication between the supply and the brake.

It is a problem in anti-skid braking systems of the kind set forth, such as the systems of GB-A-2029914 and GB-A-2069640, to ensure that initial bleeding of the system on assembly of the system on the vehicle can be carried out automatically and without an operator operation to open and close a bleed device. In addition it is also desirable to ensure that when the pump, and in particular the trapped volume of fluid supplied by the pump to support the piston in the advanced position, is bled, there is no danger of the bleed device remaining accidentally in an open position. This would cause loss of fluid from the system and consequent closure of the control valve assembly, ultimately rendering the pump inoperative.

According to our invention, in an hydraulic braking system of the kind set forth the modulator assembly comprises a bore in which works a de-boost piston for co-operation with a control valve assembly adapted to control communication between the supply of operating fluid in the bore between the piston and the control valve assembly, and the piston is held in an advanced inoperative position by a volume of fluid trapped in a space to which the fluid is supplied by the pump, a bleed device communicates with the space, friction means being provided for holding the bleed device in an open position during initial bleeding of the system, and the bleed device being adapted to close automatically when a fluid pressure to which it is subjected attains a predetermined value sufficient to overcome the friction means.

The provision of the friction means enables us, when assembling the modulator, to arrange the bleed device in the open position so that initial bleeding of the system on assembly of the system on the vehicle can be carried out automatically and without an operator operation to open and close a bleed device.

Preferably the bleed device comprises a spool working in a bore in a housing and movable between a first bleed position in which ports in the wall of the bore are in communication and a second closed position in which communication between the ports is cut-off, the friction means comprising a resilient locking member which acts between the bore and the spool, the locking member being located in a first position during initial assembly of the modulator assembly in which it acts on a releasable stop to hold the spool in the first bleed position, whereby initial bleeding of the system can take place, the force of the locking member being overcome to release the stop when a force comprising the pressure in the space acting on a pressure-responsive force on the spool attains a predetermined value, whereafter the locking member is carried by the spool into a second position as the spool is urged from the first bleed position into its second position, the locking member thereafter remaining in the said second position.

After the locking member has been carried by the spool into the second position it plays no further part when subsequent bleeding of the system is to be carried out manually.

In that connection the locking member conveniently comprises a resilient ring located in an annular recess in the portion of the spool which is of smaller diameter and the annular recess is of a length sufficient to enable the spool to be returned manually from its second position to its first bleed position to enable manual bleeding to be carried out and without such movement being impeded by the resilient ring.

Preferably a spring assembly acts to return the spool to the second position automatically at the completion of manual bleeding, and the spring assembly may comprise the spring assembly which acts to bias the de-boost piston into the advanced position.

Conveniently the spring assembly acts on the inner end of the spool, and a manually-operable member acts on the opposite, outer, end of the spool.

Since the spring assembly is operative on release of the manual force from the manually-operable member to return the spool to its second position, there is no danger of the device remaining open accidentally.

Two embodiments of our invention is illustrated in the accompanying drawings in which.

Figure 1:
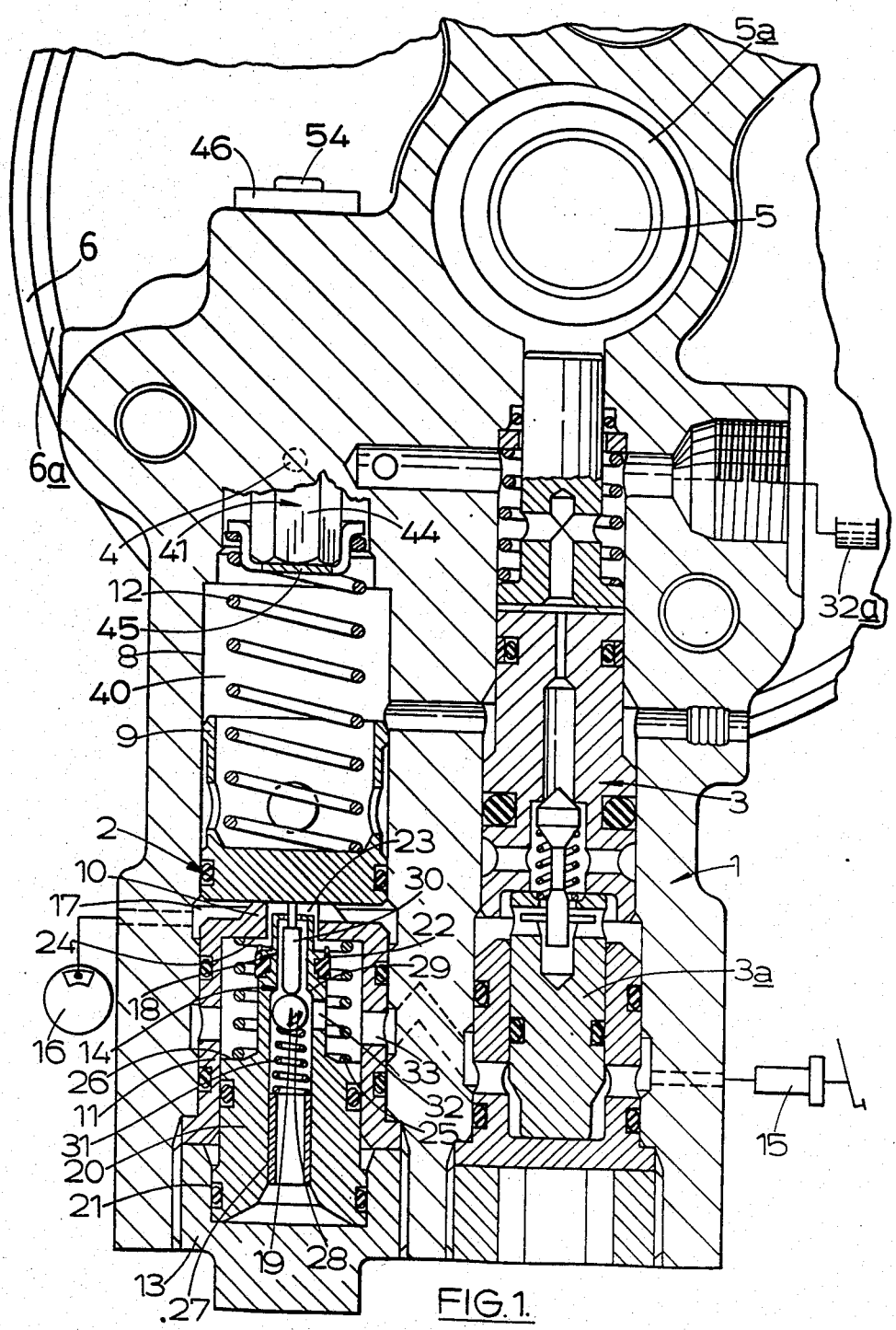
FIG. 1 is a transverse section through a combined modulator and skid sensing assembly for an hydraulic anti-skid braking system suitable for a motor-cycle or light passenger car or van.

The assembly illustrated in the drawing comprises a housing 1 incorporating a modulator assembly 2, a hydraulic pump assembly 3, and a pressure dump valve 4. A longitudinally extending shaft 5 projecting at opposite ends through the housing 1 is coupled at one end to a wheel to be braked and at the other end carries skid sensing means 6a which is enclosed within a cylindrical guard 6 carried from an adjacent end of the housing 1.

The dump valve 4 and the skid sensing means may be of any of the forms disclosed in GB-A-2029914, and the pump assembly 3 forms the subject of GB-A-2069640. These mechanisms need not be described further herein except to mention that the pump 3 is urged in one direction by an eccentric 5a on the shaft 5 and in the opposite direction by pressure from a pedal-operated master cylinder 15 which acts over an operating piston 3a.

The modulator assembly 2 comprises a bore 8 extending from the dump valve 4 and in which works a de-boost piston 9. The piston 9 is normally urged into an inoperative position against a stop comprising a wall 10 at the closed end of a sleeve 11 substantially of cup-shaped outline by means of a spring 12, and the sleeve 11 is retained in the bore 8 by means of a closure 13 for the end of the bore 8 remote from the dump valve 4.

A control valve assembly 14 housed in the sleeve 11 controls communication between the pedal-operated master cylinder 15 and a wheel brake 16 through an expansion chamber 17 defined in the bore 8 between the piston 9 and the control valve assembly 14 itself.

The control valve assembly 14 comprises a first valve 18, and a second valve 19 which are operative sequentially.

The first valve 18 comprises a first valve member 20 in the form of a stepped piston having a portion of intermediate diameter working in the bore of the sleeve 11, an outer portion of largest diameter working in a blind bore 21 of the closure 13, an inner portion of smaller diameter carrying an annular seal 22 which defines a valve head, and an innermost portion of smallest diameter which projects into a circular opening 23 in the wall 10. The valve head 22 is engageable with a seating 24 comprising an annulus on the wall 10 which surrounds the opening. Normally the head 22 is spaced from the seating 24 by means of a spring 25 which acts between the wall 10 and a shoulder 26 at the step in diameter between the intermediate and the smaller diameter portions of the piston 20.

The piston 20 has an open-ended longitudinally extending bore 27 of stepped outline in which the second valve 19 is housed. The second valve 19 comprises a valve member 28 in the form of a ball which is engageable with a seating 29 defined by a shoulder at the step in diameter of the bore 27. The ball 28 is normally urged away from the seating 29 by a probe 30 with which the piston 9 co-operates against the force in a light compression spring 31.

In the normal inoperative position shown in the drawing the dump valve 4 is closed so that the piston 9 is held in an inoperative advanced position in which the second valve 19 is held open by the probe 30, and the first valve is held open by the spring 25.

When the brake is to be applied by operation of the master cylinder 15, hydraulic fluid is supplied to the brake through radial ports 33 in the wall of the sleeve 11, and through the open first valve 18 to the expansion chamber 17. Simultaneously fluid also enters the through-bore 27 through a port 32 in the wall of the piston 20 and can pass to the expansion chamber through the open second valve 19. Thus there is a substantially unrestricted flow of fluid to the brake.

Fluid from the master cylinder acts on the shoulder 26 at the step in diameter, over the valve head 22, and over the outer end of the piston 20 which is of greatest area. The unrestricted communication continues until the pressure from the master cylinder 15 attains a predetermined value such that the force acting on the piston 20 due to the pressure acting over the end of greatest area overcomes the force in the spring 25 plus the force due to that pressure acting over the shoulder 26 and the head 22. The first valve 18 then closes, and any further pressure increase can only take place at a reduced rate by flow through a restricted path comprising the clearance between the valve member 28 and the seating 29.

When a skid signal is received the dump valve 4 opens to release the volume of fluid trapped in the bore 8 so that the piston 9 can retract against the force in the spring 12 initially to allow the second valve 19 to close since the pressure at which a skid signal can be emitted is higher than that at which the first valve 18 will have closed. This cuts-off communication between the master cylinder 15 and the brake 16, and the retraction of the piston 9 continues to increase the effective volume of the expansion chamber 17, whereby to relieve the pressure applied to the brake 16.

Opening the dump valve 4 also unbalances the pump 3 causing it to pump fluid in a closed circuit into the bore 8 from a reservoir 32a to which it is returned, through the dump valve 4. Since communication between the piston 3a and the master cylinder 15 is unrestricted, the pump 3 can move freely.

At the termination of the skid signal the dump valve 4 closes to isolate the bore 8 from the reservoir 32a and the pump 3 is then operative to increase the pressure in the bore 8, with the result that the piston 9 is urged towards its inoperative, retracted, position. Initial movement of the piston 9 in this direction re-applies the brake 16 by pressurising the volume of fluid trapped in the expansion chamber 17, and subsequent movement opens the second valve 19 to establish a restricted flow from the master cylinder to the expansion chamber 17 through the clearance between the ball 28 and the seating 29. Thus the first valve 18 closes at a predetermined pressure independent of the movement of the piston 9. The second valve 19 is closed and opened by movement of the piston 9 away from and towards its stop 10 on the sleeve 11. When the pressure from the master cylinder 15 is reduced below a predetermined value, the first valve 18 re-opens to provide a free and unrestricted communication between the master cylinder 15 and the brake 16.

Figure 2:
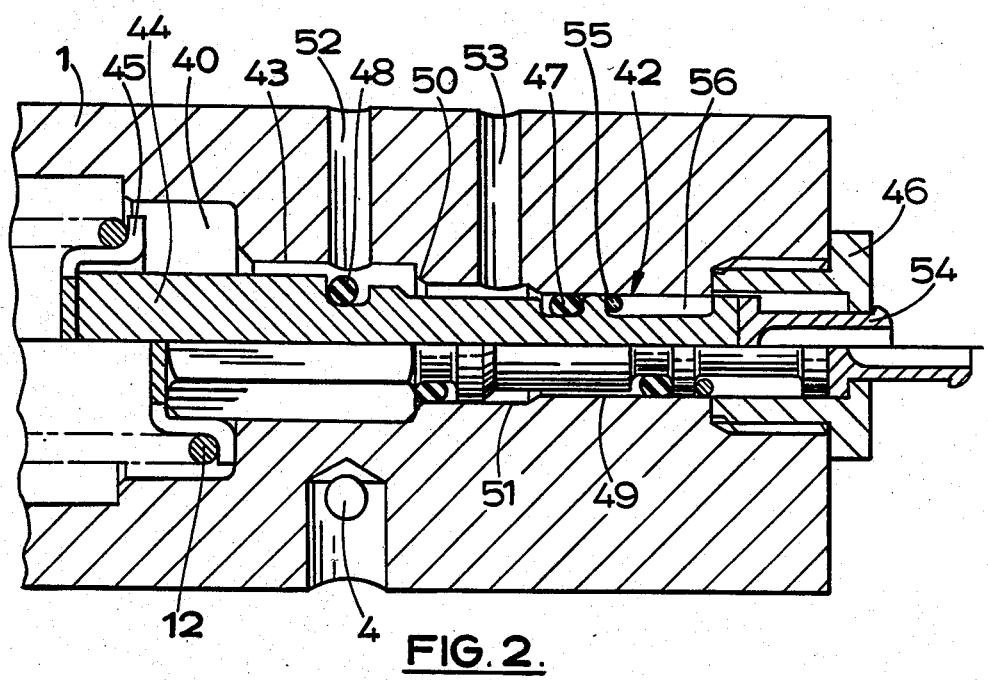
FIG. 2 is a longitudinal section through a bleed device.

Bleeding of the space 40 in which fluid is trapped and which acts normally to hold the piston 9 in the advanced position is achieved by operation of a bleed device 41 shown in detail in FIG. 2 of the drawings.

As shown in FIG. 2 the housing 1 is provided with a stepped bore 42 of which the inner end portion 43 of greatest diameter communicates with the space 40. A spool 44 of differential outline works in the bore 42. The spring 12 acts on the inner end of the spool 44, which is of greater diameter, through an abutment plate 45 to urge the spool 44 relatively outwardly and into an advanced position in which the outer end of the spool 44 co-operates with a stop comprising a closure 44 screwed into the outer end of the bore 42.

The spool 43 carries first and second axially spaced seals 47 and 48 of which the first seal 47 is permanently disposed within a portion 49 of the bore 42 which is of smallest diameter, and the second seal 47 carried by the portion of greater diameter is adapted to co-operate with a shoulder 50 at a step at the change in diameter between the portion 43 of greatest diameter and a portion 51 of intermediate diameter to isolate a radial passage 52, leading to the dump valve 4, from a bleed passage 53 to atmosphere. The bleed passage 53 is disposed between the two seals 47 and 48 and leads from the intermediate bore portion 51. The shoulder 50 is inclined or otherwise radiused to facilitate the sealing engagement of the second seal 48 into the portion 51 of intermediate diameter. This inoperative position of the spool 43 is shown in the lower portion of FIG. 2 of the drawings.

A finger piece or button 54 is disposed between the closure 46 and the outer end of the spool 44, and a circlip or spring clip 55 located in an annular recess 56 in the spool 44 engages frictionally with the portion 49 of the bore 42 which is of smallest diameter.

In the upper portion of FIG. 2 of the drawings, the spool 44 is shown in an initially assembled condition in which the seal 48 is displaced from the shoulder 50 into and spaced from the wall of the bore portion 43 so that there is free flow between the passages 52 and 53. The spool 44 is held in this position by the circlip 55 which acts as a releasable stop.

When the system has been fully bled initially, pressure of the hydraulic applied to the space 40 acts on the diameter of the spool 44 which is defined by the seal 48. This pressure, acting together with the force in the spring 12, automatically urges the spool 44 into the position shown in the lower portion of FIG. 2 with the force applied to the spool overcoming the frictional engagement of the circlip 55 and with the seal 48 engaging over the shoulder 50 and into engagement with the bore portion 49 of intermediate diameter in order to isolate the passages 52 and 53 from each other.

The circlip 55 remains in an advanced position shown in the lower portion of FIG. 2 of the drawings and manual bleeding is achieved simply by pressing the finger piece 54 inwardly to displace the spool 44 axially against the load in the spring 12.

The spool 44 will have been held in the inwardly displaced position during post-assembly bleeding as described above because the circlip 55 has now been re-positioned, as shown in the upper portion of FIG. 2 of the drawing, and the spring 12 will atuomatically restore the spool 44 to the position shown with the seal 48 isolating the two passages 52 and 53 from each other. During manual bleeding the circlip 55 remains in the advanced position.

Figure 3:
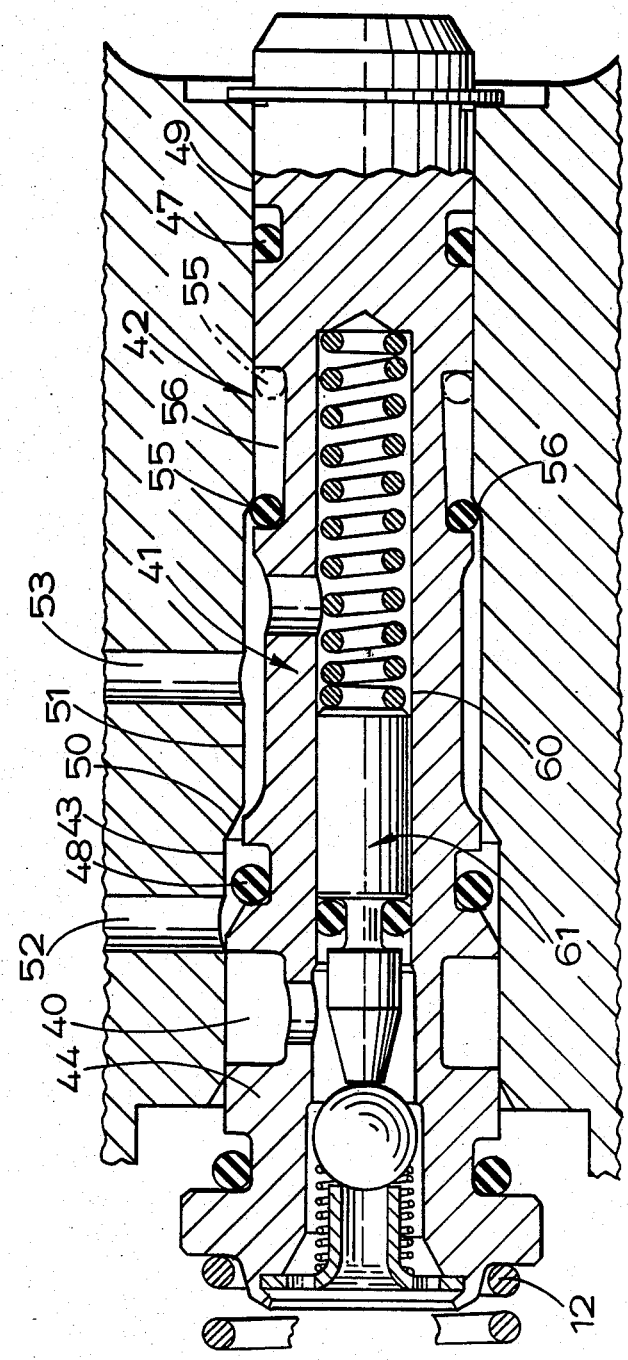
FIG. 3 is a longitudinal section through another bleed device.

In the bleed device 41 shown in FIG. 3 of the drawings the circlip 55 and the groove 56 are positioned to the rear and inwardly of the seal 47 and the finger piece 54 is omitted.

In the retracted bleed position of the spool 44 shown in the drawings, the circlip 55 engages with an inclined shoulder 56 at a step in diameter between the bore portions 51 and 49. This enhances the frictional grip of the circlip 55 and is arranged to be overcome at the said predetermined pressure, whereafter the circlip 55 is carried forward with the spool 44 and into the forward position illustrated.

The spool 44 is provided with a longitudinally extending blind bore 60 in which works a restrictor and piston assembly 61.

The construction and operation of the bleed device of FIG. 3 is otherwise the same as that of FIG. 2, and corresponding reference numerals have been applied to corresponding parts.

I claim:

1. A hydraulic anti-skid braking system for vehicles comprising a vehicle brake, a supply for operating fluid for applying said brake, skid sensing means for sensing the pressure of skid conditions at said wheel during braking and thereupon to produce skid signals, a modulator assembly for modulating the supply of fluid from said supply to said brake in accordance with said skid signals, and a hydraulic pump for controlling brake re-application following correction of said skid, said pump incorporating at least one plunger and a working chamber associated with said plunger and in communication with said modulator assembly, wherein said modulator assembly comprises a housing having a bore, a de-boost piston working in said bore and movable between an advanced inoperative position and a retracted position, a control valve assembly with which said de-boost piston is adapted to co-operate and which is adapted to control communication between said brake and said supply, said control valve assembly being movable between an open position when said de-boost piston is in said advanced position and a closed position when said de-boost piston is in said retracted position, means defining a space in said bore in communication with said working chamber and in which fluid from said pump is adapted to be trapped to hold said de-boost piston in said inoperative advanced position, a bleed device communicating with said space, said bleed device comprising a spool freely movable axially between an open position and a closed position, friction means for holding said bleed device in said open position during initial bleeding of said system, and pressure responsive means co-operating with said bleed device and responsive to fluid pressure in said system for urging said spool from said open position into said closed position, said pressure-responsive means being adapted to overcome said friction means automatically to urge said spool into said closed position when said fluid pressure attains a predetermined value.

2. A system as claimed in claim 1, wherein said housing includes a second bore, and ports in said housing communicate with said second bore, and said spool works in said second bore and is movable between a first bleed position in which said ports are in communication and a second closed position in which communication between said ports is cut-off, and wherein said friction means comprises a resilient locking member which acts between said second bore and said spool, said locking member being located in a first position during initial assembly of said modulator assembly in which said locking member acts as a releasable stop to hold said spool in said first bleed position, whereby initial bleeding of the system can take place, the force of said locking member being overcome to release said stop when a force comprising said fluid pressure in said space acting on a pressure-responsive face on said spool attains a predetermined value, whereafter said locking member is carried by said spool into a second position as said spool is urged from said first bleed position into said second position, said locking member thereafter remaining in the said second position.

3. A system as claimed in claim 2, wherein said spool is of stepped outline having a portion of smaller diameter and a portion of greater diameter, an annular recess provided in said portion of smaller diameter, and said second bore in which said spool works is stepped having a portion of smallest diameter, a portion of intermediate diameter, and a portion of largest diameter, said locking member comprising a resilient ring which is located in said annular recess in a portion of said spool which is of smaller diameter and engages slidably with said portion of said second bore which is of smallest diameter as said ring is carried by said spool from said first position to said second position.

4. A system as claimed in claim 3, wherein in said first position defining said releasable stop said ring engages frictionally with the wall of said portion of said bore which is of smallest diameter.

5. A system as claimed in claim 3, wherein in said first position defining said releasable stop said ring engages with a shoulder at a step in diameter between said bore portion which is of smallest diameter and said bore portion which is of larger diameter.

6. A system as claimed in claim 3, wherein said annular recess in which said resilient ring is located is of a length sufficient to enable said spool to be returned manually from said second position to said first bleed position to enable manual bleeding to be carried out and without such movement being impeded by said resilient ring.

7. A system as claimed in claim 6, wherein a spring assembly acts to return said spool to said second position automatically at the completion of said manual bleeding.

8. A system as claimed in claim 7, wherein said spool carries axially spaced first and second seals on said two portions of different diameters of which said first seal of smaller diameter is permanently in sealing engagement with said portion of said second bore which is of smallest diameter, and said second seal is normally urged by said spring assembly into engagement with a shoulder at a step in diameter between said portion of largest diameter and said portion of intermediate diameter to seal one of said ports constituting a bleed port leading to atmosphere from said space, a manually-operable member being adapted to co-operate with said spool to urge said spool inwardly into a bleed position against said spring loading in turn to urge said second seal away from said shoulder and thereby place said space in communication with said bleed port.

9. A system as claimed in claim 8, wherein said spool has an inner end and an outer end, and said spring assembly acts on said inner end of said spool, and said manually-operable member acts on said opposite outer end of the spool.

10. A system as claimed in claim 7, wherein said spring assembly comprises a spring assembly which acts to bias said de-boost piston into said advanced position.

11. A system as claimed in claim 8, wherein an inclined shoulder is provided between said bore portions of greatest and intermediate diameters.

* * * * *